3,523,061
POROUS SHEET MATERIALS OF MICA AND
UNFUSED STAPLE FIBERS
Robert J. Purvis, Des Moines, Iowa, assignor to Minnesota Mining and Manufacturing Company, St. Paul, Minn., a corporation of Delaware
No Drawing. Continuation of application Ser. No. 479,642, Aug. 13, 1965. This application June 20, 1969, Ser. No. 838,027
Int. Cl. D21f *11/00;* D21h *5/12*
U.S. Cl. 162—157                                                              13 Claims

ABSTRACT OF THE DISCLOSURE

Porous self-supporting mica containing sheet materials and method of making are disclosed, said sheets having excellent electrical properties resulting from a high mica content and physical properties permitting such sheets to conform to irregular surfaces and also to being impregnated with a variety of resinous materials. The mica flakes of the sheets are physically constrained within a continuous network of fibers of at least one heat fusible thermoplastic polymer, said fibers being bonded to each other at their crossing points without loss of fiber identity.

---

This application is a continuation of applicant's copending Ser. No. 479,642 filed Aug. 13, 1965 and now abandoned.

This invention relates to a new mica containing sheet construction and to a process for its preparation. In one aspect it relates to a new electrical insulating sheet material having excellent electrical properties resulting from a high mica content and physical properties permitting the sheet product to conform to irregular surfaces. In still another aspect it relates to a high mica containing sheet or strip with sufficient porosity to permit its impregnation with various resinous materials.

Several properties must be considered when determining the effectiveness of an electrical insulating sheet or strip. These include, of course, insulation properties, such as corona resistance, power factor and insulation resistance. The effect of elevated temperature on the materials of construction and their aging is also important. Physical appearance and strength, as well as handling properties, must be provided without impairing the electrical properties of the sheet. Although mica is an excellent electrical insulating material when in sheet or strip form, it lacks the physical strength necessary for many applications. For example, the natural cohesive forces between overlapping mica flakes when in sheet form is generally inadequate to permit the use of such a product in narrow tape widths. Additionally, the overlapping flakes in mica sheets tend to separate from one another when bent around a sharp corner, as when wrapped about an electrical conductor. The tear resistance of such a mica sheet is characteristically poor. To overcome these problems it has been suggested that a mica sheet material be laminated to a suitable woven or non-woven sheet material, as exemplified in U.S. Pat. No. 3,168,434. It is also possible to bond a mica sheet to a continuous plastic film through the use of an adhesive. Although these composite constructions may have improved tensile and tear strength, the reinforcing sheet material is laminated only to the outermost surface layer of mica flakes and therefore does not contribute to the internal strength of the mica sheet or solve the problem of mica flake separation upon flexing.

Another mica containing sheet construction is described in U.S. Pat. No. 3,080,272, in which a waterleaf of organic polymer fibrids and mica flakes is fused until the fibrids lose their identity and form a continuous phase. In this construction, the fibrids assist in the preparation of a homogeneous waterleaf on a forming screen, in which form it can be removed for subsequent fusion of the fibrids. One of the advantages of using fibrids in such a structure lies in the fact that they assist in providing an internally cohesive sheet which can be removed from the papermaking screen, the fibrids at least partially offsetting the loss of the natural cohesive forces normally present between overlapping mica flakes, the intimate contact of the mica flakes with each other being reduced by the presence of the fibrids.

A common problem encountered in the fabrication of mica sheets has been the problem of achieving a commercially practical method of producing said sheets by the use of conventional papermaking techniques, since the natural cohesive forces present between overlapping mica flakes seriously reduce adequate drainage of water from the "paper" stock. The introduction of materials such as resinous granules into the "paper" stock does serve to facilitate drainage; however, since these materials reduce mica-to-mica contact, the resulting sheet requires some special handling as it comes off the forming screen. It has generally been believed that the introduction into a mica sheet of materials such as fibers and filaments would also serve to reduce mica-to-mica contact and thus reduce sheet cohesion and thus similarly prevent such sheets from being handled on and removed from the paper machine. Also, since organic resinous materials are generally inferior both in thermal and in dielectric properties to mica, it is desirable to minimize their use. Accordingly, it has been difficult to obtain a porous sheet with a high mica content which can be subsequently impregnated and which can, in addition, be suitably handled and prepared on a papermaking machine.

It has been found that over a wide range of electrical stresses, the corona life of mica sheets is a function of the percentage of mica in the overall construction as well as of the planar orientation of the mica flakes. Thus, to obtain maximum electrical properties and to reduce the probability of discontinuity in the mica sheet, the mica content should be at least about 70 percent by weight of the total porous construction.

It is accordingly an object of this invention to provide a porous self-supporting sheet which can be handled on a papermaking machine having a mica content of at least 70 weight percent, in combination with synthetic or natural fibers and filaments and optionally with minor amounts of synthetic or naturally occurring fibrids. Another object of this invention is to provide a high mica content sheet which can be subsequently handled and impregnated with various organic materials.

Still another object of this invention is to provide a novel porous impregnated sheet construction having a high mica content with electrical properties approaching that of a reconstituted mica sheet. Other objects and advantages will be apparent from the following description.

It has long been known that air voids between an electrical conductor and the insulation on high voltage applications result in the occurrence of corona at undesirably low stress levels. This in turn results in a higher power factor for electrical equipment.

The porous sheet material of the present invention permits the complete impregnation of high voltage motor coils with various resinous materials, so as to eliminate the air voids. The result is an insulated conductor having the electrical properties normally associated with reconstituted mica and in addition the void free impregnated system previously obtainable only with woven cloth tapes or synthetic nonwoven webs.

It has been found that a mica sheet having from 70 to 95 parts by weight of cohesive mica flakes and from 5 to 30 parts by weight of at least one heat fusible thermoplastic fiber having a denier from 1 to 15, preferably from 1 to about 3, and a fiber length of from ⅛ inch to 1½ inches, preferably about ¼ inch can be prepared and handled on a papermaking machine and removed from the forming screen. If desired, up to about 10 parts by weight of fibrous material having a denier below 1, such as microfibers and fibrids, but no more than 50% by weight of the aforementioned thermoplastic fiber content, may be included in the construction. A "fibrid" and method for fibrid preparation is described in U.S. Pat. No. 2,999,788. It is surprising that such concentrations of relatively high denier fibers can be included in a high mica content sheet without causing such reduction in the mica-to-mica cohesive forces as to prevent sheet removal from the forming screen. When amounts of said thermoplastic fibers greater than about 30 parts by weight of the sheet are used, significant bonding between the mica platelets is lost, complicating removal of the sheet from the screen and resulting in a sheet having poor internal cohesion. Amounts of said thermoplastic fiber below about 5 weight percent have been found to be insufficient to provide the porosity necessary to allow adequate drainage of water in the forming process and to permit subsequent impregnation of the resulting construction with various organic and inorganic materials useful for modifying the physical properties of the electrical insulating sheet.

The cohesive mica flakes used in the present product may be prepared by the heat treatment technique taught in U.S. Pat. No. 2,614,055, involving the heating of crude mica to temperatures of about 800° C. to remove chemically combined water and to permit the breaking down of the crude mica by mechanical action into very thin flakes. Other processes of preparing cohesive mica flakes have been described by R. J. Ketterer in the August 1964 issue of Insulation, pages 24–32. In general, as will be appreciated, the term cohesive mica flakes as used herein encompasses mica flakes which can be laid onto a forming screen, as in a papermaking machine, from an aqueous slurry to form a self-supporting "paper." The cohesive mica flakes useful in the present invention range in size from 1 mesh to 300 mesh (U.S. Standard Sieve), the preferred range being from 2 mesh to 100 mesh (U.S. Standard Sieve).

The fibers of this invention may be selected from any of the heat fusible synthetic fibers, either crystalline or amorphous. Fibers, such as oriented and essentially amorphous unoriented polyethylene terephthalate polyesters are particularly preferred. The denier and fiber lengths of the staple fibers are within the ranges mentioned earlier, although minor amounts of some longer lengths and larger denier fibers may be tolerated in the construction. When used within the weight ranges set forth above, the larger denier fibers, because of their greater weight per unit length, provide fewer points for bonding by subsequent heat treatment and the resulting sheet has less tensile strength, less crease resistance and less tear strength. Other synthetic fibers include copolyester fibers, fibers of polyaryl sulfones, polycarbonate fibers and fibers of cellulosic derivatives.

When a minor amount of a fibrid is desired in the sheet, the polyester fibrids described in U.S. Pat. No. 2,988,782 are preferred, although other synthetic fibrids such as fibrids of polyamides, condensation products of epichlorohydrin and bisphenol A, and polysulfone resins can also be used. Fiber-like materials which are also useful can be prepared from shellac and from cellulose. Also, fibrids prepared from both "hard" and "soft" polymers, and mixtures thereof, can be employed.

The several components of the sheet construction are combined in the indicated proportions and deposited from an aqueous slurry as a uniform mixture on a foraminous surface, e.g., a forming screen. The resulting sheet contains oriented cohesive mica flakes mechanically constrained within a continuous network of heat fusible fibers. The heat fusible fibers may be bonded at their crossing points by heating to a temperature sufficient to soften the fibers, and cause fiber-to-fiber bonding throughout the sheet construction, thus forming a fiber matrix about the mica platelets. Specific temperature and conditions of heat treatment are dependent upon the nature of the fiber, but it is important to adjust the conditions of heat treatment so that the fiber material does not flow into a continuous phase, thereby losing its fibrous identity and forming a sheet with reduced porosity. When the concentration of the fibers falls within the above ranges, the natural cohesive forces between mica flakes is still available to maintain sheet integrity prior to any partial fusion and bonding together of the fibers at their crossing points. Because of the presence of the fibers the sheets exhibit good tear resistance, tensile strength and porosity. By combining the high mica content sheets of this invention with materials such as nonwoven webs and plastic films, the physical strength of the resulting composite or laminate may be further enhanced. In addition, linearly aligned filaments, e.g., glass, or other similar rayon filaments, may be incorporated between a sheet of this invention and another similar sheet or a nonwoven web or plastic film as mentioned earlier, said linearly aligned filaments imparting even greater toughness and tear resistance to the composite constructions. Such combinations may also be prepared by lamination techniques (applying heat and pressure) thereby eliminating the need for adhesives which would decrease the porosity of the sheet and possible contamination of the impregnating resin.

The manner in which the aforementioned important advantages and objectives are attained in accordance with the present invention will now be illustrated with the aid of the following non-limiting illustrative examples.

EXAMPLE 1

38.25 pounds (85 weight percent) of mica flakes, prepared by the heat treatment technique previously described, 3.4 pounds (7.5 weight percent) of amorphous 3 denier, ¼ inch polyethylene terephthalate fibers, and 3.4 pounds (7.5 weight percent) of oriented 1.5 denier, ¼ inch polyethylene terephthalate fibers were combined in 250 gallons of water to form a slurry. The stock was then fed onto a conventional Fourdrinier wire operating at a speed of 35 ft./min. at a rate sufficient to give a basis weight of 8–10 gm./ft.² The sheet was transferred from the Fourdrinier wire to a series of hot cans on which the sheet was dried. The hot cans were operated at a temperature ranging from about 190° F. to about 270° F. At the end of the hot cans, the sheet containing less than 1% moisture was fed to a tape-up roll in the conventional manner. A sheet thus produced having a thickness of 5.7 mils and a weight of 9.8 gms./ft.² was tested according to the following procedures:

Tensile strength measurements were carried out on 1 by 7 inch samples, according to ASTM D–828–60, by clamping them in 1 inch wide jaws of an Instron tester and pulling them apart at the rate of 0.2 in./min. Dielectric strength measurements were conducted according to ATSM D–149 using a ¼ inch electrode and a 500 volts/mil rate of rise, after conditioning the sample at 50% R.H. Penetration tests were conducted according to ASTM D202–69–75, using a Williams Penetrometer, modified by using a 78° F.±2° F. 60:40 weight ratio solution of Castor Oil:Toluene rather than pure castor oil.

The sheet off the Fourdrinier machine had a tensile strength of 1.1 lbs./in. width, and a penetration time of 17 seconds. These sheets were then subjected to a bonding operation at 50 lbs./in.$^2$ at 450° F. for five seconds. The sheets were placed between two sheets of glass coated with a release layer, specifically tetrafluoroethylene polymer (Teflon). The composites were placed between two sheets of 12 mils thick chrome plated steel. The total layup was placed in a press and the pressure was rapidly increased to the desired level. A 5 second period was required to open or close the press. Only the opening period is included in the reported dwell times in the examples. The bonded sheet was found to have a dielectric strength of 480 volts/mil, a tensile strength of 5.7 lbs./in. width, and a penetration time of 35 seconds.

EXAMPLE 2

1.125 gm. (7.5 weight percent) of 1.5 denier, ¼ inch polyester fibers, the polyester being a 95:5 mole ratio of terephthalic acid to isophthalic acid reacted with ethylene glycol (Vicron) were combined with the 1.125 gm. (7.5 weight percent) of 1.5 denier, ¼ inch oriented polyethylene terephthalate fibers (Dacron) in 3,600 ml. of water. This was stirred with an air motor with a half-moon blade at 500 r.p.m. for 2 minutes. The stirrer speed was reduced to between 350 to 400 r.p.m. and 12.75 gm. (85 weight percent) of repulped mica (Samica) were added. This slurry was stirred for 2 additional minutes and subsequently divided into four parts, i.e., 900 ml. of the slurry were poured into an 8 by 8 inch Williams hand sheet mold which was filled approximately ⅓ full with water. The mold was equipped with a 70 mesh screen and also a mixing rake. The rake was pulled back and forth in the slurry two times before vacuum was applied. A total of 10 to 15 seconds elapsed between the time the slurry was poured into the mold and the time the vacuum was applied. After 25 seconds the top of the mold was tilted back and two 8 by 8 inch blotters were laid on top of the formed sheet. A 25 pound roller, 8 inches long and 3 inches in diameter, was rolled back and forth across the top of the blotters twice. The two blotters and the clinging sheet were then peeled off the screen. The top blotter was removed and a dry blotter was placed on either side of the wet blotter plus the clinging sheet. This layup was placed in an unheated press. Pressure was supplied by an air piston to which 80 lbs. of air were supplied. This gave 1.25 lbs./in.$^2$ pressure on the pressed sheet. The sheet of mica plus fibers was removed from the press after 15 seconds. The sheet was then peeled off the blotters and laid onto a conventional laboratory sheet dryer with a curved surface at a temperature of 185° F. for 5–10 minutes.

The sheets thus produced were trimmed to 7½ by 7½ inch squares from which four 1 by 7 inch strips were cut for the tensile test; 3 by 3 inch squares were used for the penetration tests. A bonding operation of 20 seconds at 420° F. and 100 p.s.i. was also performed.

The sheets of this example possessed the following properties:

| | Caliper (mils) | Lbs./in. width | Kv. | Volts per mil | Penetration (sec.) |
|---|---|---|---|---|---|
| Before Pressing | 5.7 | 1.6 | 2.2 | $^1$ 395 | 20 |
| After Pressing | 4.5 | 5.7 | 2.2 | 490 | 35 |

$^1$ On 5.6 mil.

EXAMPLE 3

A hand sheet was produced according to the procedure outlined in Example 2, by combining 3.40 gms. of mica flakes and 0.37 gms. of 3 denier, ¼ inch amorphous polyethylene terephthalate fibers to produce an 8 by 8 inch hand sheet containing a 90:10 weight ratio of the above components respectively. The sheet as produced exhibited a weight of 8.50 gms./ft.$^2$, a thickness of 4.4 mils, a tensile strength of 2.2 lbs./inch width, and a penetration time of 33 seconds. After a bonding operation according to the procedure outlined in Example 1, using a dwell time of 10 seconds at 430° F. and 30 lbs./in.$^2$, the sheet had a thickness of 3.4 mils, a tensile strength of 7.0 lbs./in. width was obtained along with a dielectric strength of 465 volts/mil and a penetration time of 40 seconds.

EXAMPLE 4

A series of hand sheets were produced according to the procedure outlined in Example 2 by combining 12.75 gms. of mica flake, 1.125 gms. of amorphous 3 denier, ¼ inch polyethylene terephthalate fibers, and 1.125 gms. of oriented 1.5 denier, ¼ inch polyethylene terephthalate fibers in a slurry, and laying portions of this slurry onto a wire screen. A sheet as produced exhibited a weight of 9.0 gms./ft.$^2$, and a tensile strength of 2.4 lbs./in., along with a penetration time of 23 seconds. A series of bonding operations performed at 450° F. with a dwell time of 10 seconds resulted in the following group of properties:

| Pressure, lbs./in.$^2$ | Caliper, mils | Tensile lbs./in. width | Weight, gms./ft.$^2$ | Dielectric strength, volts/mil | Penetration time, seconds |
|---|---|---|---|---|---|
| 15.6 | 5 | 4.5 | 9.1 | 480 | 19 |
| 50 | 4.3 | 5.5 | 8.8 | 480 | 23 |
| 100 | 3.7 | 6.7 | 8.5 | 620 | 34 |
| 200 | 3.6 | 7.2 | 8.5 | 640 | 40 |

EXAMPLE 5

A number of hand sheets were produced according to the procedure outlined in Example 2 by combining 12.0 gms. of mica flakes and 3 gms. of 1.5 denier ¼ inch polyester fiber, the polyester being an 80:20 mole ratio of terephthalic acid to isophthalic acid reacted with ethylene glycol. A sheet as produced had a caliper of 3 mils, a weight of 8.25 grams/ft.$^2$, a tensile strength of 1.1 lbs./in. width, and a penetration time of 18 seconds. After a bonding operation according to the procedure outlined in Example 1, with a dwell time of 10 seconds at 430° F., and 73 lbs./in.$^2$ pressure, the sheet had a tensile strength of 18 lbs./in. width, and a dielectric strength of 520 volts/mil and a penetration time of 33 seconds.

EXAMPLE 6

Hand sheets were produced according to the procedure outlined in Example 2 containing 70% by weight mica, 10% by weight Du Pont fibrid, and 20% by weight ¼ inch, 1.5 denier, oriented polyethylene terephthalate fibers. A typical sheet exhibited a thickness of 12.4 mils, a dielectric strength of 205 volts/mil, and a penetration time of 97.7 seconds. An Elmendorf Tear test according to ASTM D689–44 and using a Thwing-Albert Elmendorf Test apparatus, was conducted on the sample and 175 gms. were required to tear it.

EXAMPLE 7

A series of hand sheets were produced in accordance with the procedure outlined in Example 2, in order to analyze the effect of fiber denier and length. The tests conducted were accomplished in the same manner as in Example 1. The pressing was done as in Example 1, except that ¼ inch steel plates were used in place of the 12 mil steel sheets. Two formulations were used. The first, number 1, contained 90% by weight of mica and 10% by weight of oriented polyethylene terephthalate fibers. The second, number 2, contained 80% by weight mica and 20% by weight oriented polyethylene terephthalate fiber. Pressing was accomplished at 400° F., 500 p.s.i. for 2 minutes. A table of the properties obtained is given below.

| | Unpressed | | | | | | Pressed | | | | |
|---|---|---|---|---|---|---|---|---|---|---|---|
| Number | Fiber length, inch | Fiber, denier | Weight, gms./ft.² | Caliper (mils) | Tensile strength, lbs./in. width | Elmendorf tear (grams) | Fiber length, inch | Fiber, denier | Weight, gms./ft.² | Caliper (mils) | Tensile strength, lbs./in. width | Dielectric strength (volts/mil) |
| 1 | ¼ | 1.5 | 11.0 | 6.2 | 6.1 | 32 | ¼ | 1.5 | 11.0 | 3.3 | 8.7 | 1,020 |
| 1 | ⅜ | 3.0 | 11.8 | 5.9 | 5.5 | 32 | ⅜ | 3.0 | 11.8 | 3.7 | 8.5 | 965 |
| 1 | ½ | 6.0 | 11.8 | 5.9 | 4.1 | 24 | ½ | 6.0 | 11.8 | 3.7 | 6.6 | 765 |
| 2 | ¼ | 1.5 | 11.0 | 7.6 | 2.0 | 24 | ¼ | 1.5 | 11.0 | 3.5 | 8.3 | 1,020 |
| 2 | ⅜ | 3.0 | 10.1 | 7.5 | 3.5 | 24 | ⅜ | 3.0 | 10.1 | 3.7 | 9.1 | 770 |
| 2 | ½ | 6.0 | 11.2 | 8.5 | 3.8 | 32 | ½ | 6.0 | 11.2 | 4.2 | 7.5 | 605 |

EXAMPLE 8

Paper was produced on a Fourdrinier machine according to the procedure outlined in Example 1. The sheets produced contained 80% mica by weight, 5% Du Pont #201 Fibrid, by weight, and 15% ¼ inch 1.5 denier oriented polyethylene terephthalate fibers, by weight. The sheets were tested in accordance with the procedures described in Example 1. Pressing was accomplished using 400° F., 500 p.s.i. and a 30 second dwell time.

| | Weight (gm./ft.²) | Tensile strength (lbs./in.) | Caliper (mils) | Dielectric strength (volts/mil) |
|---|---|---|---|---|
| Before Pressing | 4.82 | 1.1 | 1.65 | 300 |
| After Pressing | 4.68 | 2.7 | 1.58 | 300 |

This same base material was then pressed between two sheets of 2 mil polyethylene terephthalate film (Mylar) under the same pressing condition outlined in Example 1. The resulting composite exhibited 2,840 volts/mil dielectric strength on 5.7 mils. The peel strength of the laminate was 2.3 gms./inch.

EXAMPLE 9

A sheet of Example 2 was bonded to a non-woven polyester web which weighed 0.5 oz./yd.². The pressing was accomplished in the manner described in Example 1, using 430° F., and 500 p.s.i. for 90 seconds. The resulting laminate exhibited 5.79 lbs./in. width on a 6.9 mil sheet, when tested for tensile strength. The dielectric strength and penetration times were 450 volts/mil and 36 seconds, respectively.

EXAMPLE 10

A sheet of Example 2 was bonded to a 3.5 mil polyethylene terephthalate film (Mylar) according to the pressing procedure outlined in Example 1, using 440° F. and 200 p.s.i. for 90 seconds. It was then tested according to the procedures set forth in Example 1. A 7.3 mil sheet exhibited 27 lbs./in. width and 1,105 volts/mil dielectric strength.

EXAMPLE 11

Several yards of mica paper were produced according to the procedure outlined in Example 1. The paper contained, by weight, 85% mica, 5% ¼ inch, 1.5 denier oriented polyethylene terephthalate fibers, 5% ¼ inch, 1.5 denier polyester fibers (Vicron), and 5% #201 Du Pont Fibrid. This paper was subsequently bonded to reinforcing linearly laid filaments (220/50 rotoset Type 52 Bright Du Pont Dacron yarn) in the machine direction. This was accomplished by sandwiching these filaments between the above mentioned mica paper and a ½ oz./yd.² non-woven polyester web, on a bonding drum at 445° F. and using two press rolls, 6 inches in diameter, with 100 lbs. of air pressure on each end of each of the press rolls. The filaments were included at the rate of ten per inch. The completed composite construction having a basis weight of 13.2 gms./ft.² and a caliper of 7.8 mils was tested according to the procedures outlined in Example 1. The results of the testing gave an Elmendorf tear strength of 620 grams, 304 volts/mil dielectric strength, 20 seconds penetration time, and 10.2 lbs./inch width tensile strength. These properties allow the product to be machine taped on form wound coils and subsequently impregnated with a suitable resin. The resulting electrical insulation provides protection against long term corona degradation.

EXAMPLE 12

Hand sheets were produced according to the procedure outlined in Example 2 containing 80% by weight mica flakes and 20% by weight of shellac fibers. A typical sheet as produced has a tensile strength of 0.5 lb./in. width and a weight of 9.50 gms./ft.². After a bonding operation of 10 seconds at 430° F. and 100 lbs./in.², the sheet had a thickness of 5.3 mils, a tensile strength of 35 lbs./in. width and a dielectric strength of 3,000 volts.

EXAMPLE 13

Paper was produced as in Example 8, except that the 5% #201 Fibrid was replaced with fibrids of a polyamide of hexamethylene diamine and terephthaloylchloride (interfacial polymerization of a difunctional acid chloride and a difunctional amine) and the 15% oriented polyethylene terephthalate fiber was replaced with 15% glass fibers ½" long. The resulting sheet weighed 9.02 gms./ft.², had a dielectric strength of 240 volts/mil, a caliper of 4.8 mils, tensile strength of 1.1 lbs./in. width and 8.0 g. tear strength on the Elmendorf tear test. After pressing, as in Example 7 using 700° F., 1,000 p.s.i. and a dwell time of 5 minutes, the resulting pressed sheet weighed 9.02 gms./ft.², was 3.02 mils thick, and displayed dielectric strength of 280 volts/mil, tensile strength of 3.5 lbs./in. width, and 8.0 gms. tear strength on the Elmendorf tear test.

A comparison test of the relative porosities of conventional reconstituted mica and the mica sheet of the present invention produced the following data. A 4 mil conventional reconstituted mica sheet wherein the mica flakes ranged in size from 10 to 300 mesh (U.S. Standard Sieve) was found to have a minimum penetration time of 40 seconds according to ASTM D202–69–75, modified as hereinbefore set forth. In contrast, sheets of the present invention produced using the same mica but additionally containing 5% fibers showed penetration times of 15–20 seconds.

As used in the preceding examples, Du Pont fibrid and Du Pont #201 Fibrid is reported to be a polyester prepared from an 80:20 mole ratio of terephthalic acid to isophthalic acid reacted with ethylene glycol.

What is claimed is:

1. A self-supporting, homogeneous, unitary, non-laminar, porous sheet structure consisting essentially of a uniform admixture of from 70 to 95 weight percent of oriented cohesive mica flakes and from 5 to 30 weight percent of unfused smooth rod-like staple fibers of at least one heat fusible thermoplastic polymer, said smooth rod-like staple fibers having a denier from 1 to 15 and an average fiber length of ⅛ to 1½ inch.

2. A self-supporting, homogeneous, unitary, non-laminar, porous sheet structure consisting essentially of a uniform admixture of from 70 to 95 weight percent of oriented cohesive mica flakes having a size ranging from 1 to 300 mesh and from 5 to 30 weight percent of unfused smooth rod-like staple fibers of at least one heat fusible thermoplastic polymer, said smooth rod-like staple fibers having a denier from 1 to 15 and an average fiber length from ⅛ to 1½ inch.

3. The sheet structure of claim 2 having up to 10 weight percent, but less than 50 percent of the amount of said smooth rod-like staple fibers of fibrous material having a denier below 1.

4. The sheet structure of claim 2 in which said smooth rod-like staple fibers consist of a heat fusible synthetic organic thermoplastic polymer and have a denier from 1 to 3.

5. The sheet structure of claim 2 in which said smooth rod-like staple fibers consist of a heat fusible synthetic organic thermoplastic polymer and have an average fiber length of about ¼ inch.

6. A self-supporting, homogeneous, unitary, non-laminar, porous sheet structure consisting essentially of a uniform admixture of from 70 to 95 weight percent of oriented cohesive mica flakes physically constrained within a continuous network of discrete smooth rod-like staple fibers of at least one heat fusible thermoplastic polymer, said smooth rod-like staple fibers having a denier from 1 to 15 and an average fiber length from ⅛ to 1½ inch and being present in an amount from 5 to 30 weight percent.

7. A self-supporting homogeneous, unitary, non-laminar, porous sheet structure consisting essentially of a uniform admixture of from 70 to 95 weight percent of oriented cohesive mica flakes physically constrained within a continuous network of smooth rod-like staple fibers of at least one heat fusible thermoplastic polymer, said smooth rod-like staple fibers having a denier from 1 to 15 and an average fiber length from ⅛ to 1½ inch and being present in an amount from 5 to 30 weight percent, said smooth rod-like staple fibers in said continuous network being bonded to each other at their crossing points without loss of fiber identity to form a fiber matrix for said cohesive mica flakes.

8. A laminate structure comprising a nonwoven web bonded directly to a self-supporting homogeneous, unitary, non-laminar, porous sheet structure consisting essentially of a uniform admixture of from 70 to 95 weight percent of oriented cohesive mica flakes physically constrained within a continuous network of smooth rod-like staple fibers at least one heat fusible thermoplastic polymer, said smooth rod-like staple fibers having a denier from 1 to 15 and an average fiber length from ⅛ to 1½ inch and being present in an amount from 5 to 30 weight percent.

9. A laminate structure according to claim 8 having linearly aligned reinforcing filaments incorporated between said non-woven web and said self-supporting homogeneous, unitary, non-laminar, porous sheet structure.

10. A laminate structure comprising a plastic film bonded directly to a self-supporting homogeneous, unitary, non-laminar, porous sheet structure consisting essentially of a uniform admixture of from 70 to 95 weght percent of oriented cohesive mica flakes physically constrained within a continuous network of smooth rod-like fibers of at least one heat fusible thermoplastic polymer, said smooth rod-like staple fibers having a denier from 1 to 15 and an average length from ⅛ to 1½ inch and being present in an amount of from 5 to 30 weight percent.

11. A laminate structure comprising a self-supporting homogeneous, unitary, non-laminar, porous sheet structure consisting essentially of a uniform admixture of from 70 to 95 weight percent of oriented cohesive mica flakes physically constrained within a continuous network of smooth rod-like staple fibers of at least one heat fusible thermoplastic polymer, said smooth rod-like staple fibers having a denier from 1 to 15 and an average fiber length from ⅛ to 1½ inch and being present in an amount from 5 to 30 weight percent, each surface of which is bonded directly to a plastic film.

12. A method of manufacturing a self-supporting homogeneous, unitary, non-laminar, porous mica-containing sheet structure comprising forming an aqueous slurry consisting essentially of a uniform admixture of from 70 to 95 weight percent cohesive mica flakes and from 5 to 30 weight percent of smooth rod-like staple fibers of at least one heat fusible thermoplastic polymer having a denier of from 1 to 15 and an average fiber length from ⅛ to 1½ inch, applying said slurry to a foraminous surface, drawing water from applied slurry through said foraminous surface, and drying said sheet at least to a self-sustaining state.

13. A method of manufacturing a self-supporting homogeneous, unitary, non-laminar, porous mica-containing sheet structure comprising forming an aqueous slurry consisting essentially of a uniform admixture of from 70 to 95 weight percent cohesive mica flakes and from 5 to 30 weight percent of smooth rod-like staple fibers of at least one heat fusible thermoplastic polymer having a denier of from 1 to 15 and an average fiber length from ⅛ to 1½ inch, applying said slurry to a foraminous surface, drawing water from said applied slurry through said foraminous surface, drying said sheet at least to a self-sustaining state, and heat-bonding said smooth rod-like staple fibers to each other at their crossing points, without loss of fiber identity.

References Cited

UNITED STATES PATENTS

| | | | |
|---|---|---|---|
| 2,420,172 | 5/1947 | Griffeth | 161—163 X |
| 3,080,272 | 3/1963 | Jackson | 162—157 |
| 3,168,434 | 2/1965 | Heyman | 162—138 X |

HOWARD R. CAINE, Primary Examiner

U.S. Cl. X.R.

161—163, 171; 162—108, 138; 264—110